April 24, 1951 G. C. KAMMERMEYER 2,550,415
TRIPOD FOR PHOTOGRAPHIC PURPOSES
Filed March 18, 1946
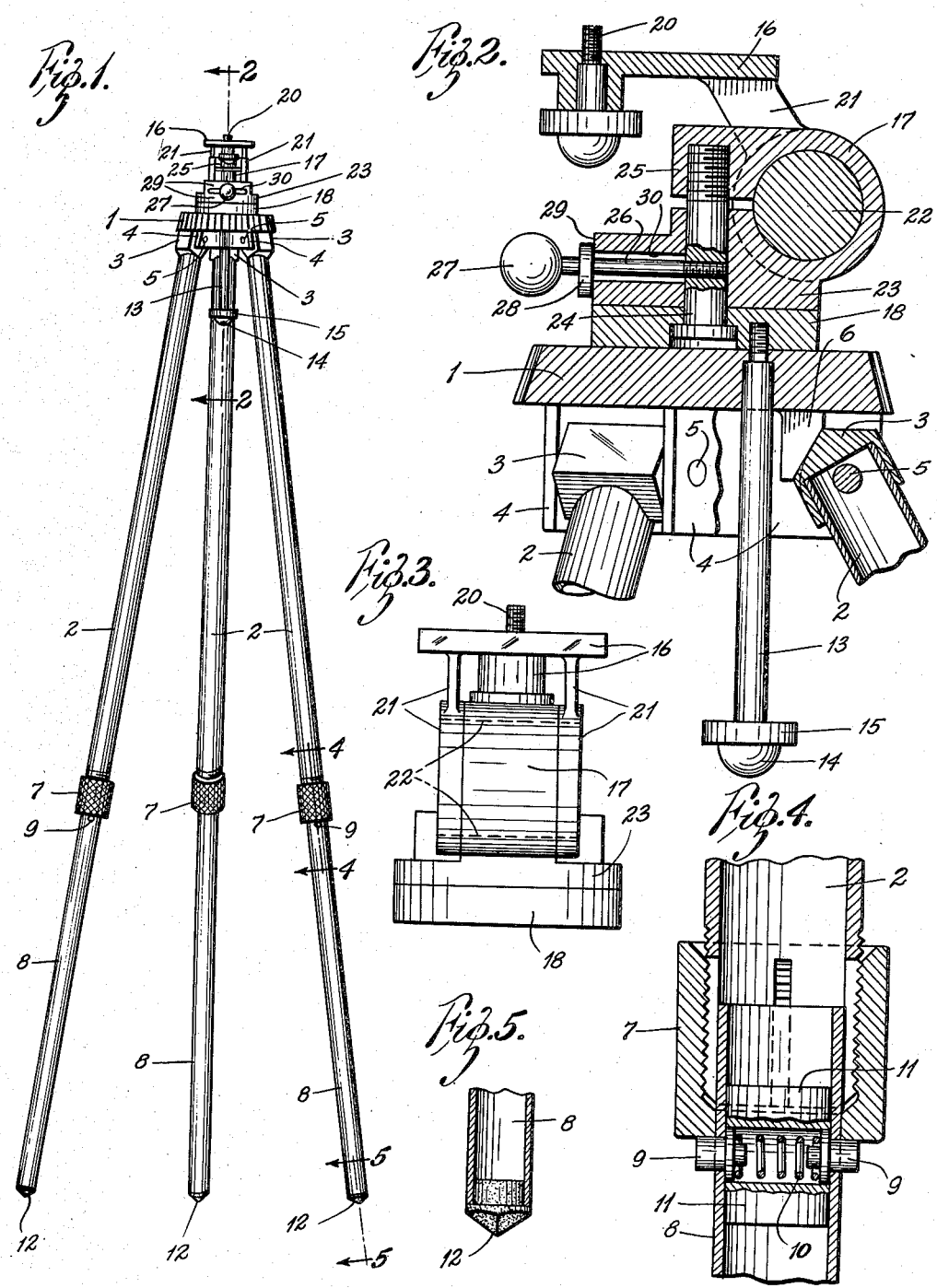
INVENTOR:
GEORGE C. KAMMERMEYER,
BY Rogers & Ezell
ATTORNEYS.

Patented Apr. 24, 1951

2,550,415

UNITED STATES PATENT OFFICE 2,550,415

TRIPOD FOR PHOTOGRAPHIC PURPOSES

George Charles Kammermeyer, St. Louis, Mo.

Application March 18, 1946, Serial No. 655,116

5 Claims. (Cl. 248—183)

The invention relates to improvements in photographic tripods having telescoping legs, and provided with a means of imparting moments in azimuth and elevation to cameras mounted thereon.

The objects of my invention are first, on the camera platform of a tripod, to provide an improved handle or grip by which said platform may be firmly grasped; second, to provide a simple and improved means of pivotally attaching tubular legs to said camera platform; third, to provide a means by which telescoping legs may be manually locked in any partially extended position, or automatically locked in a fully extended position; fourth, to provide rubber tips for tripod legs having a more positive non-slip contact with any plane surface upon which the tripod is disposed; fifth, on mounting screws used to attach cameras to tripods, a dual-purpose grip affording a means of quickly turning or threading said screw, and a means of easily tightening the same; sixth, on a device forming part of the tripod, and affording azimuth and elevation moments to a camera mounted thereon, a means of locking both azimuth and elevation moments simultaneously with a common control, and a means of adjusting the frictional load on the pivoting members of said device with the same control.

One form of my invention is illustrated in the accompanying drawing, in which:

Figure 1 is an elevation of the tripod;

Figure 2 is a vertical section of the tripod, taken on the line 2—2 of Figure 1;

Figure 3 is a view of the swivel parts of the head, taken from the right of Figure 2;

Figure 4 is an enlarged section through one of the legs, taken on the line 4—4 of Figure 1; and Figure 5 is an enlarged section of a leg tip, taken on the line 5—5 of Figure 1.

An annular plate 1, having three pairs of depending ears to which telescoping legs are pivotally attached, as will appear, constitutes a spider or head of the tripod. The circumference of the plate 1 is chamfered and knurled, providing a handle or grip, the purpose of the chamfer being to forestall natural downward slip of the operator's hand.

Each leg includes an upper tube 2, set into a hexahedron 3 pivotally supported between one of the pairs of ears 4 on a pivot pin 5. A pair of shoulders, one of which is shown at 6 in Figure 2, project inwardly from each ear 4 toward its mate. These serve to prevent the hexahedron 3 from pivoting outward beyond the desired position.

As shown in Figure 2, the sides of the hexahedronal heads 3 are rounded off to permit swinging in of the legs. The opposite end of the upper tube 2 is split into segments, threaded externally on said segments, and fitted with a collet 7, threaded thereon. The collet is provided with an internal chamfered flange which wedges the split segments on the bottom of the upper tube 2 against the inner or lower section 8 of the telescoping leg, thereby affording a means of locking the lower section 8 in any partially extended position. Near the upper end of the lower section 8, two studs 9, 9 spring-loaded by a common helical spring 10 project from opposite holes in the circumference of the lower tube 8 to retain it in a fully extended position. A cylinder 11, axially aligned with the lower tube 8, has a hole passing through it at right angles to its axis, enclosing the studs 9 and the spring 10, and thereby forestalling accidental displacement of the studs, as they have enlarged flanges within the cylinder.

On the other end of each lower tube 8, a rubber tip 12, of inverted pyramidal design is provided. The lower section of the lower tube 8, when fully extended, revolves freely on its axis, thereby permitting any one side of the tip 12 to seat flat on any plane surface upon which the tripod, with its legs pivoted outward to their limit, is disposed.

A camera may be mounted directly on the plate 1, the threaded end of a rod 13 being screwed into the camera's tripod socket. On the opposite end of the rod 13 a handle is provided, which is composed of two grips, the smaller tip 14 being used for quickly turning or threading the rod 13, and the larger grip 15 affording a more positive grip by which to tighten the rod 13.

In lieu of a camera, a device affording movements in both azimuth and elevation for a camera mounted thereon may be similarly mounted on the plate 1. Said device shall hereinafter be referred to as a "panorama head," a term commonly applied by photographers to similar devices, although such devices normally afford both panoramic and elevation movements to cameras mounted thereon. The panorama head of my tripod consists of a camera platform 16 pivotally disposed from a split sleeve 17 that, in turn, is pivotally disposed on an annular plate 18 serving as a base to the panorama head. The plate 18 is attached to the base plate 1 by the rod 13.

A mounting screw 20 used to attach a camera to the platform 16 is provided with a handle of similar design to the handle 14, 15 on the rod 13. The platform has two depending struts 21 formed integrally therewith. They are secured to a cylinder 22 pivotally disposed in the split sleeve 17. The split sleeve 17 is formed integrally with an annular plate 23 bearing on and axially aligned with the plate 18. A rod 24, pivotally retained in the plate 18, is threaded at the other end into a boss 25 projecting from the split sleeve 17. A rod 26 is threaded into the screw 24, as shown, and is provided with a handle 27 and a flange 28 which seats against the edges 29 of a sectorial slot 30 extending edgewise into the plate 23. When the threaded rod 26 is loosened, its handle end 27 may be displaced in the slot 30 in a direction to loosen the pivot screw 24 from the upper flange 25 of the split sleeve. This simultaneously loosens the cylinder 22 in the sleeve to permit adjustments of elevation, and loosens the plate 23 to permit adjustments of azimuth. When proper adjustment is obtained, the handle 27 is displaced oppositely in the slot 30 to tighten the screw 24, thereby securing both adjustments in one operation. Then the handle 27 is twisted, to cause the flange 28 to bear against the edges 29 of the slot 30, to lock the screw 26 in its tightening position.

I am aware that prior to my invention tripods having telescoping legs, and panorama heads have been made. I therefore do not claim such a combination broadly; but I claim:

1. In a tripod or the like, a head, a platform, and means attaching the head to the platform for rotation about two axes, including an intermediate member between the head and the platform, the member having a split sleeve, a cylinder on the platform rockably mounted in the sleeve, a screw extending through the base and rotatively mounted therein, means limiting axial movement of the screw in the base, the screw extending through both elements of the split sleeve, and threadedly engaging the one nearer its end, whereby when the screw is tightened it will clamp the split sleeve around the cylinder and will clamp the base and intermediate members against the base, and a handle on the screw spaced from its threaded end.

2. In a tripod or the like, a base, a screw vertically extending from the base, the screw having a head to limit movement through the base, an intermediate member mounted on the screw for rotation, the member having a horizontally disposed sleeve with a clamping portion threadedly engaged with the screw, a platform having a cylindrical portion rockably mounted in the sleeve, the screw being turnable to clamp the sleeve on the cylindrical portion and to clamp the intermediate member to the base, a cross pin in the screw, and extending laterally therefrom to constitute a handle.

3. In a tripod or the like, a base, a screw vertically extending from the base, the screw having a head to limit movement through the base, an intermediate member mounted on the screw for rotation, the member having a horizontally disposed sleeve with a clamping portion threadedly engaged with the screw, a platform having a cylindrical portion rockably mounted in the sleeve, the screw being turnable to clamp the sleeve on the cylindrical portion and to clamp the intermediate member to the base, a cross pin in the screw, and extending laterally therefrom to constitute a handle, the intermediate member having an opening to receive the cross pin and in which the pin can move arcuately about the axis of the screw.

4. In a tripod or the like, a base, a screw vertically extending from the base, the screw having a head to limit movement through the base, an intermediate member mounted on the screw for rotation, the member having a horizontally disposed sleeve with a clamping portion threadedly engaged with the screw, a platform having a cylindrical portion rockably mounted in the sleeve, the screw being turnable to clamp the sleeve on the cylindrical portion and to clamp the intermediate member to the base, a cross pin in the screw, and extending laterally therefrom to constitute a handle, said cross pin having a threaded end engaging the screw and having a flange, the flange being engageable with the intermediate member when the threaded end is turned in one direction, and being releasable from the intermediate member when said threaded end is oppositely turned.

5. In a tripod or the like, a head, a platform, and means attaching the head to the platform for rotation about two axes, including an intermediate member, a vertical pivot between the intermediate member and the head, a horizontal pivot between the intermediate member and the platform, the intermediate member having a split sleeve embracing one of said pivots, and the other pivot consisting of a screw passing through the sleeve to releasably clamp the same, said other pivot having a head at one end to prevent axial movement and threads at its other end, one of its ends being interfitted into the head and the other into the split sleeve, the threaded end being engaged with threads, whereby rotation of the said other pivot simultaneously clamps the split sleeve and clamps the intermediate member and the base, and an operating handle on the said other pivot spaced from its threaded end toward its head.

GEORGE CHARLES KAMMERMEYER.

REFERENCES CITED

The following references are of record in the file of this patent:

UNITED STATES PATENTS

| Number | Name | Date |
| --- | --- | --- |
| 1,770,721 | Willis | July 15, 1930 |
| 1,854,951 | Neuwirth | Apr. 19, 1932 |
| 2,143,606 | Mooney | Jan. 10, 1939 |
| 2,226,827 | Moore | Dec. 31, 1940 |